June 5, 1962 F. NEWKIRK ETAL 3,037,443
MEANS FOR HEATING PREPARED AND PACKAGED SANDWICHES
AND SIMILAR ARTICLES OF FOOD
Filed Jan. 26, 1955 2 Sheets-Sheet 1

INVENTORS:
FLOYD NEWKIRK
RAYMOND KOWALSKEY
BY
ATTORNEY

June 5, 1962

F. NEWKIRK ETAL 3,037,443

MEANS FOR HEATING PREPARED AND PACKAGED SANDWICHES
AND SIMILAR ARTICLES OF FOOD

Filed Jan. 26, 1955

INVENTORS:
FLOYD NEWKIRK
RAYMOND KOWALSKEY
BY
ATTORNEY

United States Patent Office 3,037,443
Patented June 5, 1962

3,037,443
MEANS FOR HEATING PREPARED AND PACK-
AGED SANDWICHES AND SIMILAR ARTICLES
OF FOOD
Floyd Newkirk, Affton, Mo. (10066 Kalinda Lane, St.
Louis 28, Mo.), and Raymond Kowalskey, Affton, Mo.
(10049 Stonell Place, St. Louis 23, Mo.)
Filed Jan. 26, 1955, Ser. No. 484,182
6 Claims. (Cl. 99—332)

This invention relates in general to certain new and useful improvements in food preparation equipment for use in small restaurants, soda fountains, snack bars, taverns, and the like, and more particularly, to a method and means for heating prepared and packaged sandwiches and similar articles of food.

Many small eating establishments, such as roadside diners, snack bars, taverns, and drugstore soda fountains, cannot economically maintain an adequate food service department for preparing various types of sandwiches when, as, and if ordered by customers. Instead, such establishments purchase a miscellaneous assortment of sandwiches from wholesale suppliers who maintain a central kitchen and a series of delivery trucks which service routes along which the various eating establishments are located. Ordinarily, such sandwiches are served cold and, for that reason, are not as palatable as possible. Usually, the wholesale sandwich companies wrap the sandwiches for sanitary purposes and, in fact, the health regulations in most metropolitan areas request such procedure. Consequently, it is difficult, if not virtually impossible, to heat the sandwich or otherwise handle it except to place it in wrapped condition upon a plate and serve it to the customer.

It is, therefore, the primary object of the present invention to provide a method and means for heating and serving prepared and packaged sandwiches.

It is another object of the present invention to provide a heating grill in which packaged sandwiches can be heated for a controlled period and removed directly upon the serving plate without disrupting, breaking, or damaging the wrapper in which the sandwich is packaged.

It is also an object of the present invention to provide a sandwich grill which is capable of heating a packaged sandwich without burning or in any other way impairing the envelope or wrapper in which the sandwich is packaged.

With the above and other objects in view, our invention resides in the novel means and processes presently described and pointed out in the claims.

In the accompanying drawings (two sheets):

Figure 1:
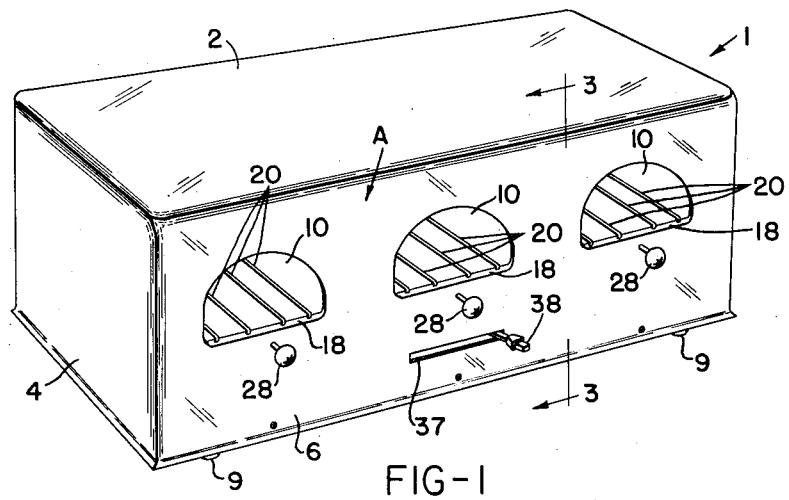
FIGURE 1 is a perspective view of a sandwich grill constructed in accordance with and embodying the present invention.
Figure 5:
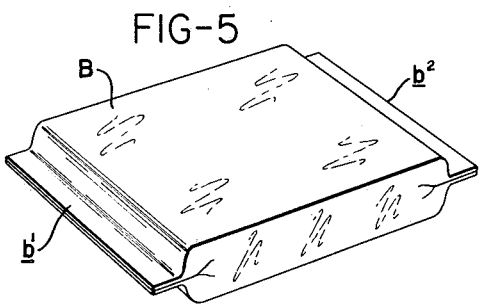
FIGURE 5 is a perspective view of a sandwich uniquely packaged in accordance with the teachings of the present invention.
Figure 6:
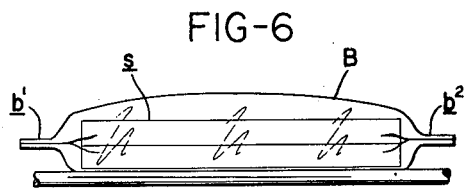
FIGURE 6 is a fragmentary side elevational view of the sandwich in place within the sandwich grill while being heated.
Figure 7:
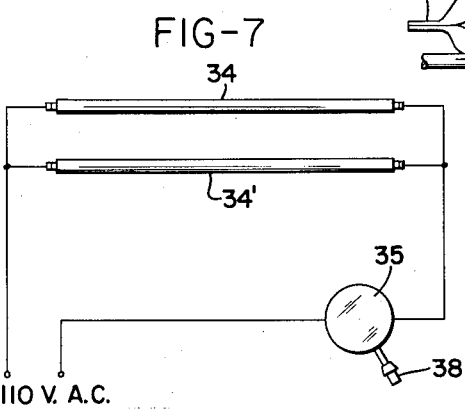
FIGURE 7 is a schematic wiring diagram showing the electrical circuit forming a part of the present invention.
Figure 2:
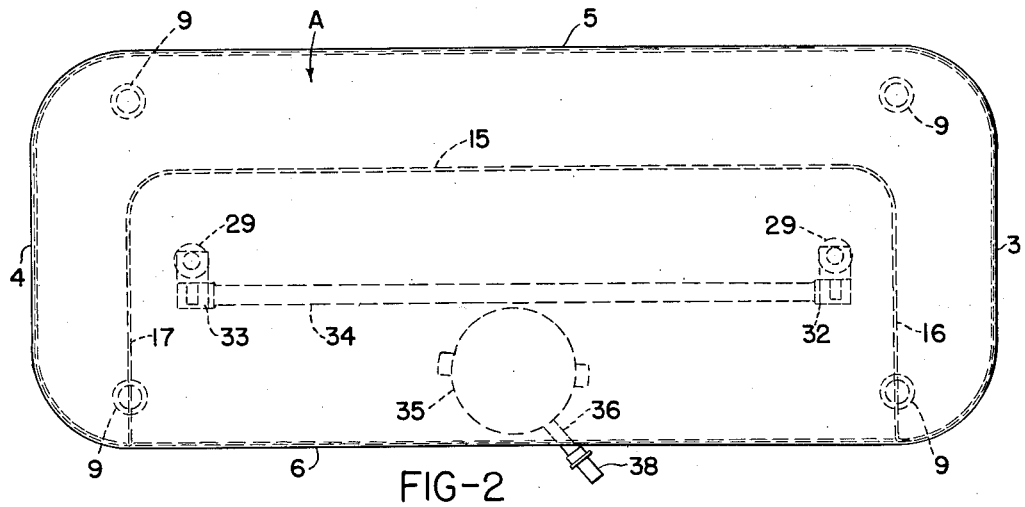
FIGURE 2 is a top plan view of the sandwich grill.

In brief outline, the present invention resides in the discovery that a sandwich or similar article of food can be sealed within an envelope or wrapper made of cellophane or similar transparent synthetic film and placed on a grill located between sources of infra red radiation. It has been found that wrapping materials of the type stated are substantially transparent to infra red radiations within the range of 15,000 to 30,000 A. or 1.5 to 3.0 microns at approximately 2500° K. Within this wave band of radiation, cellophane and similar transparent synthetic films transmit practically all of the radiation without substantial absorption, so that a sandwich which has been enveloped in a cellophane or similar bag will be heated thoroughly by the infra red rays, although the bag itself will not be sufficiently heated to melt, burn, or otherwise become structurally impaired. As a result of actual experimentation, it has been found that the bread of the sandwich will become toasted and the meat, cheese, or other material within the sandwich will become thoroughly heated without the slightest damage to the bag.

The present invention also contemplates the utilization of an enclosed grill structurally arranged to support a packaged sandwich between sources of infra red radiation of the type above-mentioned with mechanical means for removing the sandwich after it has been properly heated, and preferably including means for automatically timing the period of exposure to heat.

Referring now in more details and by reference characters to the drawings, which illustrate a preferred embodiment of the present invention, A designates a sandwich heating device comprising an outer cabinet or housing 1 formed preferably of chromium plated steel, stainless steel, or any other suitable material of construction and integrally including a top wall 2, end walls 3, 4, a back wall 5, and a front wall 6. Provided for snug-fitting disposition closurewise within the bottom of the housing 1 is a bottom wall 7 provided around its periphery with a continuous upturned flange 8 adapted for securement against the lower interior faces of the housing walls 3, 4, 5, 6. The bottom wall 7 is furthermore conventionally provided with four inserted rubber plugs 9 which project downwardly therefrom and serve as feet upon which the entire structure is supported.

Figure 4:
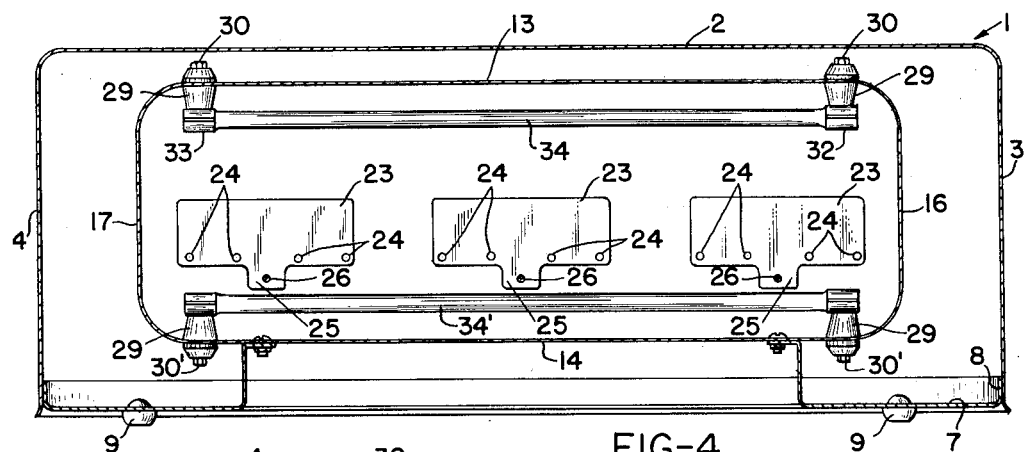
FIGURE 4 is a longitudinal sectional view taken along line 4—4 of FIGURE 3.
Figure 3:
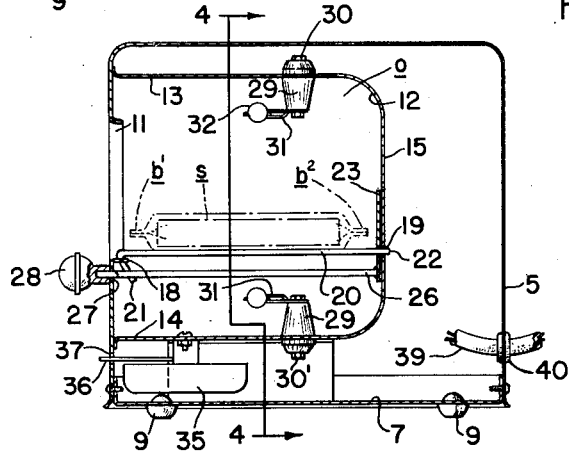
FIGURE 3 is a vertical sectional view taken along line 3—3 of FIGURE 1.

The front wall 6 is provided with three uniformly spaced openings 10, each provided around its periphery with an integral inwardly extending flange 11. Spot welded or otherwise rigidly secured to the interior face of the front wall 6 is a deep drawn inner shell or liner 12 including a top wall 13, a bottom wall 14, a rear wall 15, and end walls 16, 17, marginally connected in an integral structure arranged in spaced parallel relation to the corresponding walls of the housing 1, whereby to enclose and define an oven-space o to which access may be had through the openings 10, all as best seen in FIGURE 3. The lower or horizontal portions of the flanges 11 of the openings 10 are provided with a plurality of uniformly spaced apertures 18 which are respectively aligned with similar apertures 19 formed in the back wall 15 of the liner 12. Provided for removable disposition within the liner 12 are grill-forming rods 20 having downwardly bent hook-like ends 21 engaged in the apertures 18 and rearwardly projecting straight ends 22 for loose fitting disposition in and through the apertures 19. Provided for slidable disposition within the oven-space o, in rearwardly spaced alignment with each of the openings 10, is a vertical pusher plate 23 having apertures 24 for slidable engagement around the rods 20. The pusher plates 23 are, furthermore, provided centrally of their lower margins with downwardly extending ears 25 rigidly secured to the rear ends of pull rods 26, which extend horizontally upwardly and project through apertures 27 formed in the front wall 6 directly below and centrally of each of the openings 10. At their outwardly projecting ends, the pull rods 26 are rigidly secured within knobs 28 formed preferably of a synthetic resin or similar heat-insulative material. Mounted in and extending through the top wall 13 adjacent the end walls 16, 17, are ceramic insulator posts 29 having electrically conductive bolts 30 extending therethrough and being provided at their lower ends with split-tongued clips 31 for slidable retentive engagement with the flattened terminal conductors 32, 33, of a quartz infra red radiator or tube 34. Similarly mounted in the bottom wall 14 are ceramic insulator posts 29' having electrically conductive bolts 30' and clips 31' for engagement with the terminal conductors 32', 33', of an infra red radiator or tube 34', the tubes 34, 34', being located respectively above and below the grill-forming rods 20, all as best seen in FIGURES 3 and 4.

Bolted or otherwise rigidly secured upon the under face of the wall 14 and disposed in the space above the bottom wall 7 is a conventional electrical timer-switch 35 having an actuating handle 36 which projects forwardly through an elongated horizontal slot 37 formed in the front wall 6 and is provided at its outer end with a suitable knob or handle 38. The tubes 34, 34', and timer-switch 35 are connected electrically to a two-wire conductor 39 which extends through a rubber grommet 40 inserted in the back wall 5 for connection to any suitable source of electrical power (not shown).

In use, a sandwich S is placed within a cellophane bag B, the ends of which are heat sealed as at $b^1$, $b^2$. Thus, the sandwich S is hermetically enclosed within a transparent envelope or container and will not dry out when kept in a refrigerator for several days. Whenever the customer orders a sandwich, the sandwich S, enclosed within its bag B, is removed from the refrigerator and inserted through one of the openings 10 onto the grill-forming rods 20, the pusher plate 23 having been shoved inwardly to the position shown in FIGURE 3. Thereupon, the timer-switch 35 is turned on and the sandwich S exposed to infra red radiation for a predetermined period of time. It has been found in this connection that a period of three minutes is a fully satisfactory time interval and that the sandwich, after three minutes of exposure, will be well toasted and heated through and through. Most conventional timer-switches, however, can be set for a shorter interval than the maximum interval for which they are designed and it is, of course, possible to heat the sandwich for a shorter period if so desired.

As soon as the interval established by the timer-switch 35 has expired, the current to the tubes 34, 34', will be shut off and the sandwich may be removed by pulling the knob 28 forwardly, thereby shifting the pusher plate 23 outwardly toward the openings 10 and pushing the bag B, with its enclosed hot sandwich S, outwardly through the opening 10. It will, of course, be obvious that three sandwiches can be heated simultaneously in the sandwich heating device A herein described, but it should be understood that a sandwich heating device capable of heating a smaller or larger number of sandwiches can be constructed in accordance with the present invention.

It should be understood that changes and modifications in the form, construction, arrangement, and combination of the several parts of means for heating prepared and packaged sandwiches and similar articles of food and in the methods of using the same may be made and substituted for those herein shown and described without departing from the nature and principle of our invention.

Having thus described our invention, what we claim and desire to secure by Letters Patent is:

1. A toaster, comprising a casing having an opening in its vertical front wall, a vertical partition within said casing, a rail supported by and between the front wall of said casing and said partition adjacent to the lower level of said opening, an impelling element slidably guided by said rail, shifting means projecting through an aperture in said front wall and connected to said element to eject through said opening a body resting upon said rail, and a source of infra-red heat rays within said casing operative to cook edible substances resting within said casing upon said rail forwardly of said element.

2. A toaster according to claim 1 characterized by a plurality of said rails, a plurality of said independent impelling elements, and said source of heat rays being common to said plurality of bodies supported upon said rails adjacent to said respective shifting means.

3. A toaster, comprising a casing having an aperture in its front wall, a vertical partition within said casing, said front wall adjacent to the lower level of said aperture being deflected inwardly to provide a flange, a plurality of parallel rods supported by and between said flange and said level of said aperture, said rods being independently removable from positioning apertures in said flange and said partition, a plurality of impelling elements, each of said elements having a depending ear and each of said elements resting slidably upon a plurality of said rods, shifting means connected to the respective ears of said elements and projecting through the front wall of said casing, to permit said elements to be shifted independently of one another to eject through said opening bodies resting upon said rails, and sources of infra-red heat rays within said casing above and below said aperture and common to the areas forwardly of said elements.

4. A toaster, comprising a casing having an opening in its front wall, a vertical partition within said casing, a flange comprising an integral extension of said front wall and directed substantially horizontally inwardly adjacent to the lower edge of said aperture and provided with spaced apertures, a plurality of rods having depending angular end portions detachably engaging said flange in its said apertures, and projecting loosely through spaced apertures in said partition to permit them to be readily removed independently of one another, a plurality of impelling elements, each of said elements resting slidably upon a plurality of said rods and having a depending ear, shifting means connected to the respective ears and projecting slidably through said front wall, to permit said elements to be shifted independently of one another to eject through said opening a body resting upon said rods, and a source of infra-red heat within said casing and common to the areas forwardly of said elements.

5. A toaster according to claim 4 in combination with variable control means to discontinue the generation of heat following a predetermined period.

6. A toaster, comprising a casing having an opening in its front wall, a vertical partition within said casing, a flange comprising an integral extension of said front wall and directed substantially horizontally inwardly adjacent to the lower edge of said opening and provided with spaced apertures, a plurality of rods having depending angular end portions detachably engaging said flange in said apertures, and projecting loosely through spaced apertures in said partition, to permit them to be readily removed independently of one another, a plurality of impelling elements, each of said elements resting slidably upon a plurality of said rods and having a depending ear, shifting means connected to the respective ears and projecting slidably through said front wall, to permit said elements to be shifted independently of one another to eject through said opening a body resting upon said rods, and a source of infra-red heat within said casing and common to the areas forward of said elements.

References Cited in the file of this patent

UNITED STATES PATENTS

| | | |
|---|---|---|
| Re. 24,296 | Stewart | Mar. 26, 1957 |
| 1,032,267 | Bastian | July 9, 1912 |
| 1,647,013 | Partridge | Oct. 25, 1927 |
| 1,838,552 | Huenefeld | Dec. 29, 1931 |
| 1,862,733 | Wright | June 14, 1932 |
| 1,870,735 | Jones | Aug. 9, 1932 |
| 1,998,615 | Groven | Apr. 23, 1935 |
| 2,028,159 | Kemp | Jan. 21, 1936 |
| 2,340,354 | Wells | Feb. 1, 1944 |
| 2,364,049 | Bensel | Dec. 5, 1944 |
| 2,439,283 | Bennett | Apr. 6, 1948 |

(Other references on following page)

UNITED STATES PATENTS

| | | |
|---|---|---|
| 2,480,679 | Spencer | Aug. 30, 1949 |
| 2,495,435 | Welch | Jan. 24, 1950 |
| 2,504,110 | Davis et al. | Apr. 18, 1950 |
| 2,573,115 | Sisto | Oct. 30, 1951 |
| 2,594,743 | Dietert et al. | Apr. 29, 1952 |
| 2,658,984 | Mohn | Nov. 10, 1953 |
| 2,725,454 | Wilcox | Nov. 20, 1955 |
| 2,762,320 | Ireland | Sept. 11, 1956 |
| 2,767,297 | Benson | Oct. 16, 1956 |
| 2,824,943 | Laughlin | Feb. 25, 1958 |
| 2,864,932 | Forrer | Dec. 16, 1958 |
| 2,927,523 | Pritz | Mar. 8, 1960 |

FOREIGN PATENTS

| | | |
|---|---|---|
| 251,168 | Switzerland | July 16, 1948 |
| 1,071,547 | France | Mar. 3, 1954 |

OTHER REFERENCES

Barber: "Industrial Application of Infrared," Electrical Engineering, September 1953, pages 764 to 769.